W. W. GREEN.
Cultivator-Teeth.
No 27,363. Patented Mar. 6, 1860.
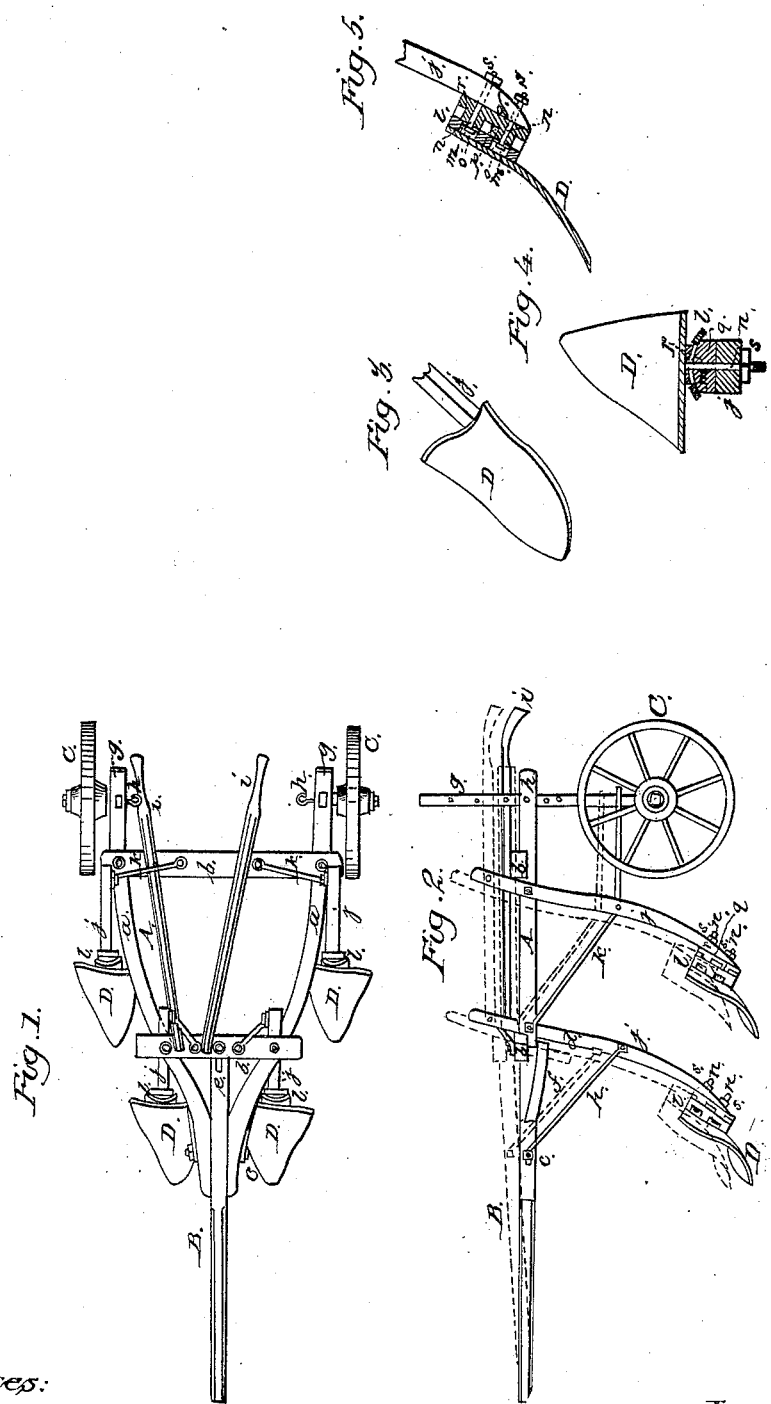

UNITED STATES PATENT OFFICE.

W. W. GREEN, OF CHELSEA, ILLINOIS.

IMPROVEMENT IN CULTIVATORS.

Specification forming part of Letters Patent No. 27,363, dated March 6, 1860.

*To all whom it may concern:*

Be it known that I, W. W. GREEN, of Chelsea, in the county of Will and State of Illinois, have invented a new and Improved Cultivator; and I do hereby declare that the following is a full, clear, and exact description of the same, reference being had to the annexed drawings, making a part of this specification, in which—

Figure 1 is a plan or top view of my invention; Fig. 2, a side view of the same with a small portion of the framing bisected; Fig. 3, a detached perspective view of a share of the same; Fig. 4, a detached transverse section of the same and its connection with its standard *x x*, Fig. 5, indicating the plane of section; Fig. 5, a vertical central section of the same, taken in the line *y y*, Fig. 4.

Similar letters of reference indicate corresponding parts in the several figures.

This invention relates, first, to an improved arrangement of means for elevating and depressing the shares so that the same may, when in operation, be made to penetrate the earth at a greater or less depth, as circumstances may require, the arrangement also admitting of the adjustment of the shares above the surface of the earth to facilitate the removal of the implement from place to place.

The invention relates, secondly, to a novel way of attaching the shares to their standards, whereby the shares may be adjusted more or less obliquely either to the right or left, as the proper cultivation of the crop may require.

To enable those skilled in the art to fully understand and construct my invention, I will proceed to describe it.

A represents the frame of the machine, which is formed of two bars, *a a*, connected by traverse-pieces *b b*. The frame A is of V form, or a form approximating thereto, the front parts of the bars *a a* being curved to form hounds, between which the draft-pole B is secured by a bolt, *c*. To the under side of the first traverse-bar *b* a curved perforated bar, *d*, is attached, said bar passing through a slot, *e*, in the back end of the draft-pole B, which is secured at the desired point by a pin, *f*. Through the back parts of the bars *a a* of the frame vertical bars *g g* pass. The lower parts of these bars *g* are bent in a horizontal position to form arms for wheels C C, which support the back end of the frame. The bars *g* pass loosely through the bars *a a* of the frame, so that the latter may be readily raised and lowered thereon and secured at the desired point by pins *h*. To the traverse-pieces *b b* of the frame handles *i i* are attached.

To the frame A standards *j* are secured by bolts and firmly stayed by braces *k*, which may be arranged in any suitable way. Two standards, *j*, are shown attached to each side of the frame A, but more may be used, if necessary. The standards are of slightly-curved form, and to their lower ends shares D are attached, one to each. These shares are of curved form, so as to combine a mold-board and share, and they are attached to the standards as follows:

To the back side of each share D, at its upper part, there is secured a socket, *l*. These sockets are longitudinal halves or sections of tubes, and each has two transverse slots, *m m*, made in it, one slot being over the other, through which bolts *n n* pass. The heads of the bolts cannot pass through the slots, and they are retained in spaces *o* between the shares and the outer sides of the sockets, the latter having projections *p*, into which bolts pass and secure the shares to the sockets.

To the lower parts of each standard there is secured a plate, *q*. These plates have each two semi-cylindrical projections, *r r*, on their face sides, which projections correspond inversely with the sockets *l*, as shown clearly in Fig. 4. The bolts *n* pass through the projections *r r* and standards *j*, and have nuts *s* on their outer stands.

From the above description it will be seen that the shares D, by unscrewing the nuts *s*, may be turned laterally in a more or less oblique position with the standards *j*, and secured at the desired point by screwing the nuts *s*, the bolts *n*, when the nuts *s* are screwed up firmly, clamping the sockets *l* and projections *r* together. By this adjustment of the shares D the earth may be thrown toward or from the plants, as desired, and in greater or less quantities, and when the implement is used for eradicating weeds only, the shares may be adjusted at right angles with their standards.

The shares may be made to penetrate the earth at a greater or less depth by raising or lowering the frame A and securing it at the proper point by the pins *h*, the front end of the draft-pole being adjusted accordingly by means of the pin $f$, passing through the inner end of the pole and the bar $d$. This adjustment of the draft-pole is necessary in order that its front part may be properly supported by the team to sustain the front part of the machine. Consequently when the frame A is raised the front part of the pole must be correspondently depressed, and vice versa.

I do not claim the shape or form of the shares D, for similar shares have been previously used; but I do claim as new and desire to secure by Letters Patent—

1. Having the wheels C C of the implement attached to vertical perforated bars $g\,g$, which pass loosely through the back part of the frame A, in connection with the adjustable draft-pole B, the whole being arranged as and for the purpose set forth.

2. Attaching the shares D to their standards $j$ by means of the sockets $l$, plates $q$, and bolts $n$, the sockets and plates being attached respectively to the shares and standards, and the bolts passing through the sockets, plates, and standards, the bolts passing through transverse slots $m$ in the sockets and projections $r$ on the plates, the whole being arranged as and for the purpose set forth.

W. W. GREEN.

Witnesses:
JOHN LEFFLER,
H. M. BENNETT.